CARRIER WAVE TELEPHONY

Original Filed Feb. 12, 1954

4 Sheets-Sheet 1

Inventors
William C. Dillon
Clarence H. Kehm
By
Schroeder, Hofgren, Brady & Wagner
Attorneys Inventor
William C. Dillon
Clarence H. Kehm
By Schroeder, Hofgren, Brady & Wegner
Attorneys April 16, 1963 W. C. DILLON ET AL 3,086,171

CARRIER WAVE TELEPHONY

Original Filed Feb. 12, 1954 4 Sheets-Sheet 3

Inventors
William C. Dillon
Clarence H. Kehm
By Schroeder, Hofgren, Brady & Wegner
Attorneys Inventors
William C. Dillon
Clarence H. Kehm
By
Schroeder, Hofgren, Brady & Wegner
Attorneys

United States Patent Office 3,086,171
Patented Apr. 16, 1963

3,086,171
CARRIER WAVE TELEPHONY

William C. Dillon, Van Nuys, Calif., and Clarence H. Kehm, Chicago, Ill., assignors to W. C. Dillon & Company, Inc., a corporation of Illinois Original application Feb. 12, 1954, Ser. No. 409,888. Divided and this application Oct. 12, 1959, Ser. No. 846,040
2 Claims. (Cl. 325—55)

This invention relates to carrier wave telephony and more particularly to improvements in carrier wave telephone systems of the character described in our U.S. Patents No. 2,535,906 and No. 2,604,544.

This application is a division of our copending application, Serial No. 409,888, filed February 12, 1954, now abandoned.

A carrier wave telephone system such as that described in our prior patents is particularly adapted for use in small towns or rural communities, providing the efficient, private service of a single party system used in a large city, while permitting a single transmission line to accommodate a large number of subscribers.

In our carrier wave telephone system as described in the above patents, the central office is provided with a unit for each of the subscriber's stations, this unit including a carrier wave generator, the necessary filters and phase shift circuits, a modulator-demodulator circuit and means for signalling to the operator and for making the necessary changes in the circuit when a subscriber initiates, answers or terminates a cell. The subscriber's or substation unit includes a transmitter and receiver, which may be of the suitable handset type, a filter network and modulator-demodulator means.

The carrier wave generators at the central station operate continuously and output signals of each is coupled to the transmission line. The filters associated with the various substations are each tuned to the frequency of a different one of the oscillators, there being an oscillator for each substation. When a subscriber desires to initiate a phone call, his actions, such as lifting the receiver from its cradle, provide an indication in the central office in response to which the operator may make the necessary connections to communicate with the subscriber. As the subscriber speaks at a substation, the carrier wave of the frequency associated with his substation is modulated in accordance with the information he wishes to transmit. At the central station, this carrier is demodulated and the information or audio signal is communicated to the operator.

The central station unit associated with the calling subscriber may then be connected through a switchboard and connector unit tto the central station unit of the subscriber being called or to a conventional battery or toll circuit if desired. After the called subscriber answers his ring, the conversation between the two parties may proceed, the audio information from one party modulating the carrier wave at his station, being removed from the carrier by a demodulator at the central station and there modulating the second party's carrier. The signal received at the second party's station is then demodulated and the audio information coupled to the receiver of the telephone unit.

Servicing problems are minimized with our system inasmuch as there are no vacuum tubes or other similar apparatus which require constant service located at the subscriber's station. All such equipment is concentrated at the central station where ample room may be provided for the necessary equipment and where constant servicing and maintenance are not a problem. Furthermore, no power is required at the subscriber's station other than that which may be derived from the carrier wave carried by the transmission line.

This rather brief summary of the operation of the apparatus is intended to be illustrative of the type of system disclosed in our previous patents and with which the improvements of the present invention are concerned. Further details may be obtained from these patents.

A principal feature of the invention is the provision, at the central station, of two separate independent phase shift networks, at least one of which is adjustable. In a communication system such as this it is necessary to compensate for the phase shift which occurs in the signal both at the central station, in the transmission line and at the subscriber's station. It is a feature of this invention that a first phase shift network is connected between the transmission line and the central station and is adapted to correct for the phase shift in the transmission line and in the substation, while a second phase shift network is connected between the first phase shift network and the central station and is adapted to correct for the phase shift in the central station. The second phase shift network may be preadjusted to correct the central station phase shift, while the first network is adjustable; adjustment being made only after installation of the equipment and without the necessity of test equipment at the subscriber's station.

Further features and advantages will readily be apparent from the specification and from the drawings, in which.

Reference will now be made to the drawings for a brief description of the operation of the system and a detailed description of the improvements disclosed herein. A detailed description of those phases of the operation of the system which are here described only briefly, may be found in our aforementioned patents.

Figures 1, 2:
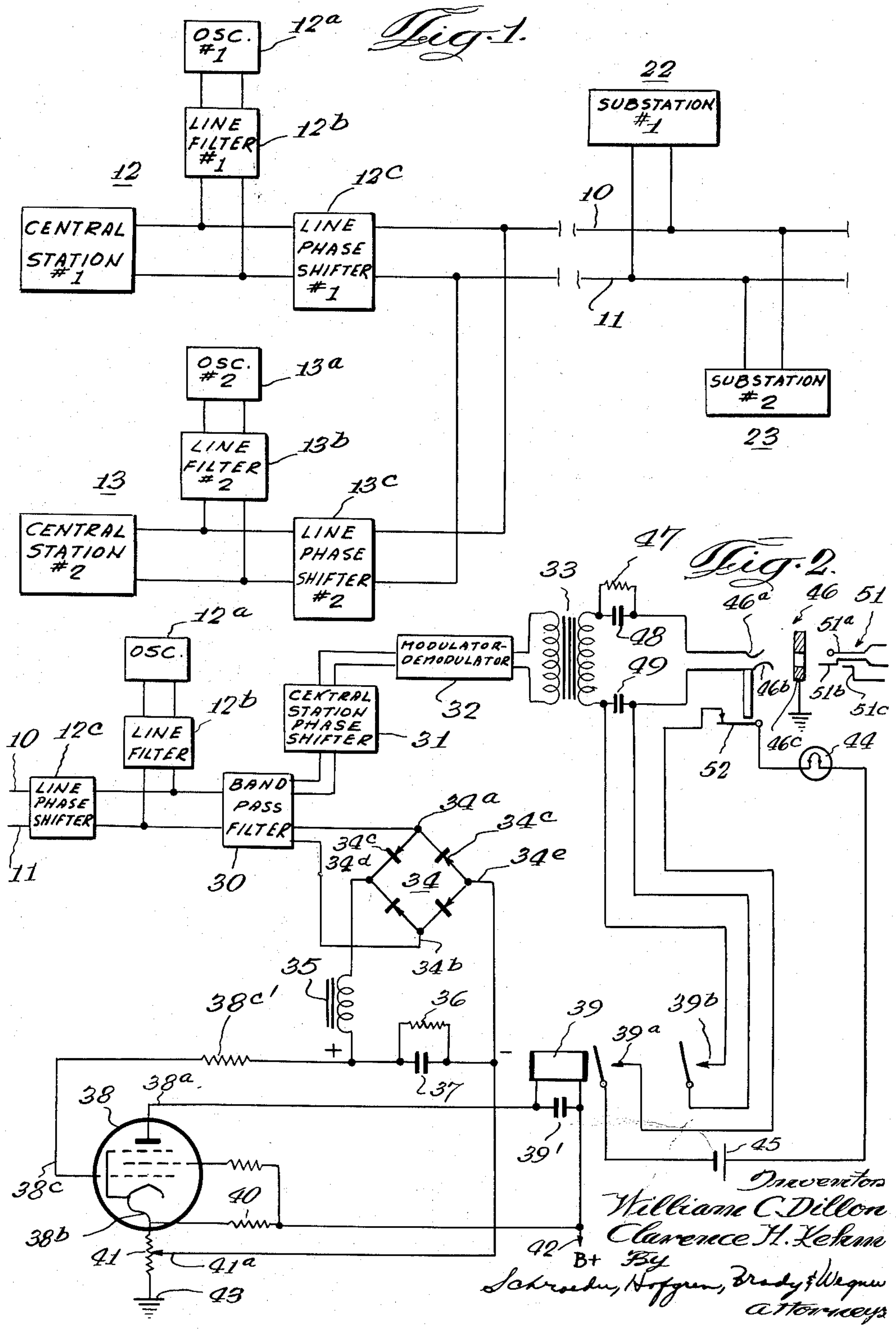
FIGURE 1 is a block diagram of a carrier wave telephone system.
FIGURE 2 is a diagram of a central station unit, partially in block form and partially in schematic, showing a preferred embodiment of the central station relay operating circuit.

FIGURE 1 of the drawings illustrates in block form the basic carrier wave telephone system. A transmission line which may comprise parallel wires 10 and 11, is provided to interconnect the various elements of the system and represents an actual physical line which may extend for a substantial distance, for example twenty-five or more miles. A central office is located at a point on the transmission line, generally at one end thereof, and includes a plurality of central station units such as 12 and 13, only two being shown here. A number of local subscriber stations or substations, such as 22 and 23 are connected to the transmission line at various points along its length and spaced from the central office, as many as thirty or more substations sometimes being connected to a single transmission line, again only two being shown for the sake of simplicity. In general, there will be one central station unit for each substation.

Each central station unit is provided with an oscillator, **12*a* and 13*a*, tuned to different carrier frequencies, above the audio range and spaced about 4000 cycles apart. Line filters 12*b* and 13*b* are interposed between the respective oscillators and the transmission line to isolate the oscillators therefrom except at the desired frequency. Each substation is also provided with a filter network which renders it responsive only to the signal of the frequency of the oscillator forming a part of the central station unit associated therewith. Similarly, the central station units are also provided with filter means which isolate them from the line at frequencies other than that of the oscillator associated therewith. The line phase shifters 12*c* and 13*c*** which are interposed between the central station units and the transmission line compensate for the phase shift in the line and in the respective substations, as will appear more fully later.

When a subscriber desires to make a call, he may signal this intention to the operator at the central office as by lifting the telephone handset from its cradle. This action will cause a change in the voltage level of the carrier frequency associated with his substation which change acts on circuits at the central station providing an indication to the operator of the subscriber's action. The operator will then take the appropriate steps to plug into the subscriber's central station unit through the central office switchboard (not shown in FIG. 1) which may be of any suitable design. Since only the one carrier frequency is acted on by each substation and its associated central station this may be done without interrupting any other conversations which are taking place on the transmission line to or from other substations.

The operator may then make the necessary connections through the switchboard to connect the caller with his desired party who may have a telephone on the same or another carrier wave system, or on a local battery circuit or the like. As the subscriber talks at his substation, his voice modulates the carrier wave associated with his station. At the central office, this modulated signal is demodulated in the central station unit corresponding to the subscriber's substation and the audio signal is coupled through the switchboard to, for example, the central station unit of another subscriber on the same line. Here the carrier wave of the second subscriber is modulated by the audio signal and transmitted to the substation of the other party to the conversation, at which point this signal is again demodulated and the audio information delivered to the other party.

Inasmuch as each substation and associated central station unit is responsive only to a single carrier frequency, there is complete privacy and no interference between users even though many conversations may be carried on at the same time.

Referring now to FIGURE 2, an improved circuit for operating the central office relay, which furnishes an indication to the operator of the action of the subscriber in initiating, answering or terminating a call, will now be described. In our aforementioned patents, two different systems were described. In the first of these, the action of the subscriber in lifting his phone from the cradle caused the line to resonate at the frequency of his substation, thus causing an increase in the voltage level of his carrier on the line. In the other and preferred system, this action of the subscriber places a load on the line causing the level of carrier voltage to drop. It will suffice for our present purpose to make the statement that the action of the subscriber in removing or replacing the handset of his telephone, it being assumed that certain circuit controlling switches are associated therewith, causes a change in the level of voltage on the line. It is desired to utilize this change in voltage to operate certain circuits in the central station as by energizing or deenergizing a relay having contacts associated therewith and which are connected into the circuits to be controlled. It has been found that in many cases the change of the voltage level is insufficient in and of itself to cause the desired action of the relay without using very sensitive and expensive relays.

In FIGURE 2 a portion of a central station unit, such as unit 12, is shown in schematic form to illustrate this control circuit. The transmission line, 10 and 11, is connected through line phase shifter **12*c* to band pass filter 30 which is tuned to the frequency of oscillator 12*a*; the oscillator being connected to the transmission line through line filter 12*b*. The signal passed by band pass filter 30 is divided into two portions, one of which is coupled through central station phase shifter 31 and modulator-demodulator unit 32 to an audio transformer 33, the purpose of which will be explained later. The other portion of the output of band pass filter 30 is connected to the input terminals 34*a* and 34*b* of a bridge-type, full wave rectifier 34, the rectifier preferably including four cold rectifying elements 34*c*, which may be of any suitable type such as copper oxide dry plate rectifiers or germanium diodes. The output of the rectifier 34 is developed between terminals 34*d* and 34*e* and is filtered by a circuit including series inductor 35 and the shunt combination of resistor 36 and capacitor 37 in parallel. Thus there appears across the parallel resistor-capacitor combination a D.C. voltage which has an amplitude directly related to the amplitude of the carrier voltage appearing on transmission line 10 and 11**.

An amplifying device, such as vacuum tube 38, is provided and has connected in the circuit of the plate **38*a* thereof central station control relay 39 which as mentioned before is utilized to give an indication to the operator and to control certain circuits at the central office. Bias means are provided for the amplifier 38 in the form of a voltage divider made up of resistors 40 and 41 connected between B+, 42, and ground 43. The cathode 38*b* of the tube is connected to the juncture between resistors 40 and 41 and thus maintained at a fairly high positive potential with respect to ground 43. The grid 38*c* of the amplifier is connected to the output of rectifier 34, in such a manner that the output voltage thereof biases the grid positively, and is returned to movable tap 41*a* on resistor 41 connected between cathode 38*b*** and ground.

Assuming, for the purposes of illustration, that the system here being used is the preferred one discussed above in which the voltage level on the transmission line is normally rather high while the subscriber's handset remains in the cradle, the output of rectifier 34 will be relatively high and a large voltage will appear across resistor 36 and capacitor 37, tending to make the grid **38*c* of the amplifier positive. Under these conditions, even though the grid is returned to a negative voltage at tap 41*a* on resistor 41, the tube 38 will conduct heavily and insure energization of relay 39 maintaining contacts 39*a* and 39*b*, associated therewith, in an open condition as shown in the drawings. When the subscriber at the substation associated with the central station unit under discussion lifts his handset from the cradle, the load on the transmission line will increase substantially, reducing the level of the carrier voltage thereon. The drop in the level of the carrier voltage will result in a decrease of the D.C. output voltage of rectifier 34 and grid 38*c* of the tube 38 will become quite negative by virtue of its return connection to tap 41*a* on resistor 41. This will reduce the plate current of tube 38 sufficiently to cause deenergization of relay 39, allowing contacts 39***a* and 39*b* to close.

Contact 39*a* of relay 39 completes the energization circuit of indicator lamp 44 on the switchboard at the central station, indicating to the operator that the subscriber of substation 1 has picked up his handset and desires to make a call. Battery 45 is provided for the energization of lamp 44 and, if desired, each of the lamps (associated with the other substations) on the switchboard may be energized from this same source. Contact 39*b* also closes completing the secondary circuit of audio transformer 33. So long as contact 39*b* is closed, any audio information which is obtained from the carrier wave in demodulator 32 will appear at terminals 46*a* and 46*b* of jack 46. Resistor 47 in the secondary circuit of the transformer 33 limits the direct current which may flow in this circuit while capacitor 48 in shunt therewith provides a by-pass for audio frequencies. Capacitor 49, which shunts switch contact 39*b* permits the passage of the ringing signal when contact 39*b* is open, as will appear later.

In response to the light of lamp 44, the operator at the central station will insert plug 51 of the central office connector unit into jack 46, the tip portion 51*a* of the plug making contact with leaf 46*a* of the jack, while the ring portion 51*b* contacts leaf 46*b* of the jack. The body or barrel portion 51*c* of the plug engages grounded ring 46*c* of the jack. This connection permits the operator to talk with the subscriber through the central office connector unit, as will be explained later, and in addition through the mechanical action of plug 51 and jack 46 opens switch 52 in the circuit of indicator lamp 44, the switch being mechanically coupled to the lower leaf 46*b* of the jack as shown.

To summarize the operation of this circuit, tube 38 is normally biased so as to be heavily conductive when the handset of the subscriber's telephone rests in the cradle. The action of the subscriber in lifting his handset to initiate or to answer a phone call lowers the level of the carrier voltage on the line and reduces the output of rectifier 34, driving the tube into cutoff and deenergizing relay 39 allowing contacts 39*a* and 39*b* to close. Conversely, when the phone is replaced on its cradle, the carrier voltage on the line rises and the output of rectifier 34 again becomes great enough to cause tube 38 to conduct heavily energizing relay 39 and opening contacts 39*a* and 39*b*.

Amplifier 38 may sometimes hereinafter be described as having a first condition and a second condition or as being either conductive or cut off. It is to be understood that it is intended that this language means that amplifier 38 either conducts heavily enough to insure energization of relay 39 or, in the other condition, that the plate current thereof is so limited as to prevent energization of the relay. It is not necessary that the tube conduct at its full rated capacity in the one condition or be completely cut off in the other if relay 39 is chosen to have the proper characteristics.

Resistor 38*c′*, connected in series with control grid 38*c*, limits the grid current which will be drawn if the grid should be driven positive. Capacitor 39′, connected in shunt with relay 39, serves to reduce fluctuations in the plate current of the amplifier preventing undesired actuation of the relay.

Figure 3:
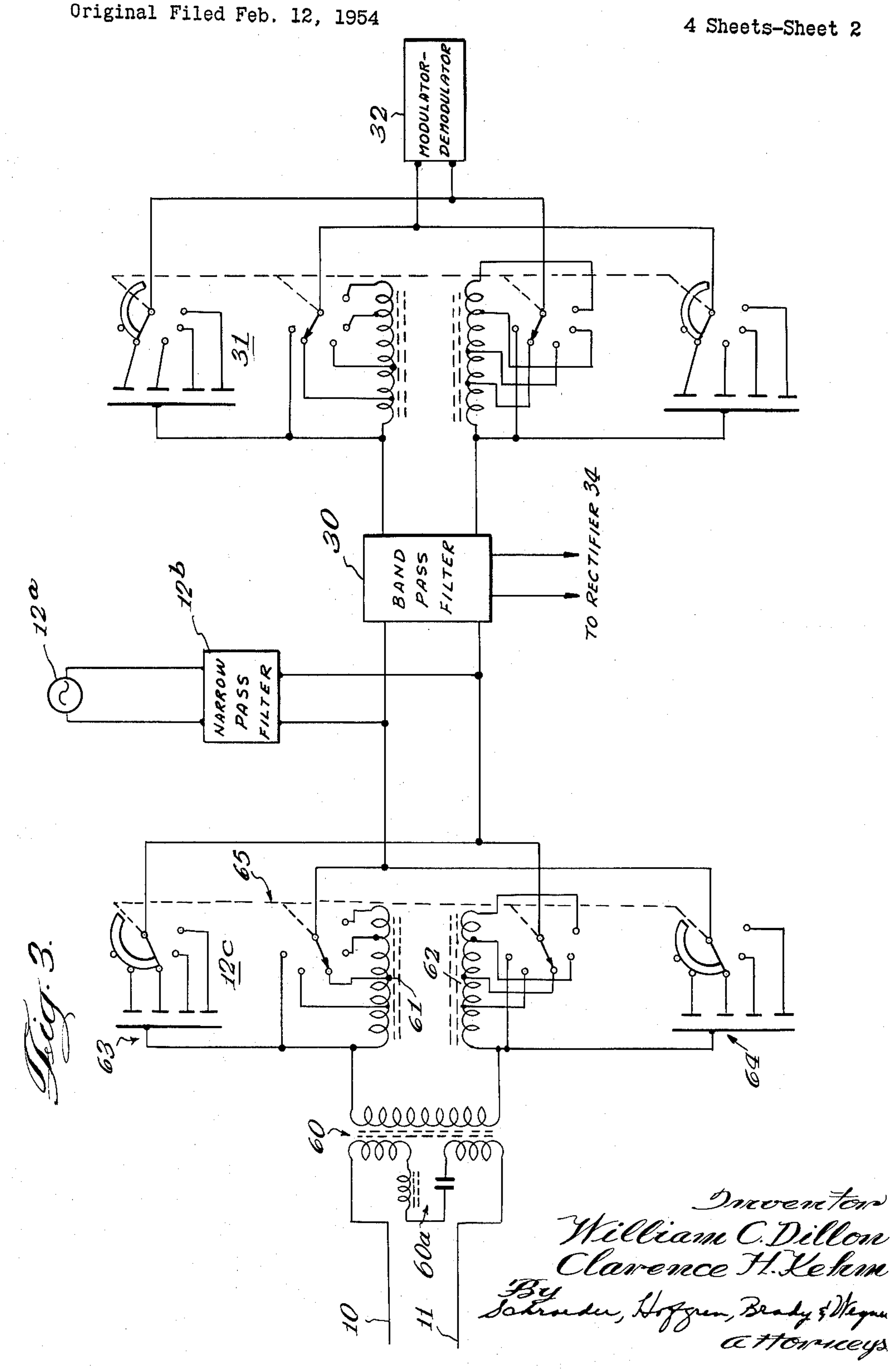
FIGURE 3 is a diagram of a portion of a central station unit, partially in schematic form, and showing a preferred embodiment of the phase shift correction network.

Turning now to FIGURE 3, the phase shift correction circuits utilized at the central station will be described. In the past it has been the practice to provide two separate phase shifting networks for each substation, one at the central office unit corresponding thereto and the other at the substation. Both of these units were generally adjustable in nature in order to compensate for varying conditions such as frequency, length of the transmission line, height of the line above ground and spacing of the wires in the line, all which have an effect on the total phase shift present in the circuit. A system of this nature is rather difficult to adjust properly inasmuch as each unit has to be individually adjusted and this required the extensive use of a considerable amount of test equipment both at the central office and at the subscriber's station. With the circuit to be described, all phase shifting is accomplished at the central station providing a much more easily adjustable system.

In FIGURE 3, the transmission line 10 and 11 is coupled through an input transformer 60 to a line phase shifter indicated generally as 12*c*. A series inductance-capacitance circuit 60*a* in the primary of transformer 60 is tuned to resonate at the carrier frequency of the unit. The output of the line phase shifter is coupled through band pass filter 30 to the input of central station phase shifter 31, the output of which is coupled to modulator-demodulator 32 as previously described. Carrier wave oscillator 12*a* is coupled through filter 12*b* to the line at a point between the two phase shift circuits.

The phase shift circuits are identical in construction and each comprises a lattice inductance-capacitance arrangement with the inductance portions being connected in series in the circuit and the capacitance portions connected in shunt. Each of the elements of the filters is variable and adjustment thereof may be made by means of a ganged control switch.

Phase shifter 12*c* will now be described in detail. A pair of tapped inductances, 61 and 62 are serially connected in the line, while a pair of variable capacitors 63 and 64 are connected diagonally in shunt therewith. By a diagonal shunt connection, we mean one wherein capacitor 63 is connected between the input side of inductor 61 and the output side of inductor 62 while capacitor 64 is connected between the input side of inductor 62 and the output side of inductor 61, the input side being for the purposes of this discussion the side which is connected to the transmission line. (It should be realized however that this circuit is bilateral and signals pass in both directions therethrough.)

Each of the elements of the lattice phase shift network is divided into a plurality of sections and a four gang selector switch is provided for choosing the desired arrangement. This provides a variable phase shift which is preferably adjustable from 0 to 90°. This variation may be made in any number of steps desired, depending on the degree of accuracy to which it is desired to correct the phase shift in the circuit. In the phase shifter shown in FIGURE 3, a four-step selector switch is provided.

The values of the components of the phase shift networks will of course be different for each carrier frequency. However, for the sake of illustration we will here give the values of such a network for use with a carrier of 7,150 cycles per second. The inductors 61 and 62 will each have a total inductance of 6 millihenrys and when used for four-step operation, will be tapped in four equal sections of 1.5 millihenrys each. The capacitors 63 and 64 have a maximum capacity of .16 microfarad and in a four-step phase shift each of the individual sections has a value of .04 microfarad. Each step of the phase shifter provides a phase shift of 22½. The central station phase shifter 31 is identical with line phase shifter 12*c*.

In practice, central station phase shifter 31 will be preadjusted at the factory to compensate for the phase shift in the circuits of the central station unit, that is the modulator-demodulator 32, band pass filter 30 and associated apparatus. If desired, the phase shift present in each central unit can be calculated and the phase shifter 31 designed with fixed components rather than making it adjustable as shown in FIGURE 3.

Line phase shifter 12*c* is utilized to compensate for the phase shift which takes place both in the subscriber's substation and in the transmission line between the substation and the central office. Inasmuch as the phase shift which must be corrected varies considerably from unit to unit due to the difference in the length and other characteristics of the line, the line phase shifter must necessarily be adjustable.

The circuit of FIGURE 3, in which two phase shifters are provided at the central station, eliminates the necessity of the provision of a phase shifter at the subscriber's substation, greatly simplifying the problems involved in installing and adjusting a carrier wave telephone system. In addition, it is always preferable to have as much of the circuitry as possible at the central station as this renders servicing much easier in the event any of the circuit elements should fail.

Figure 4:
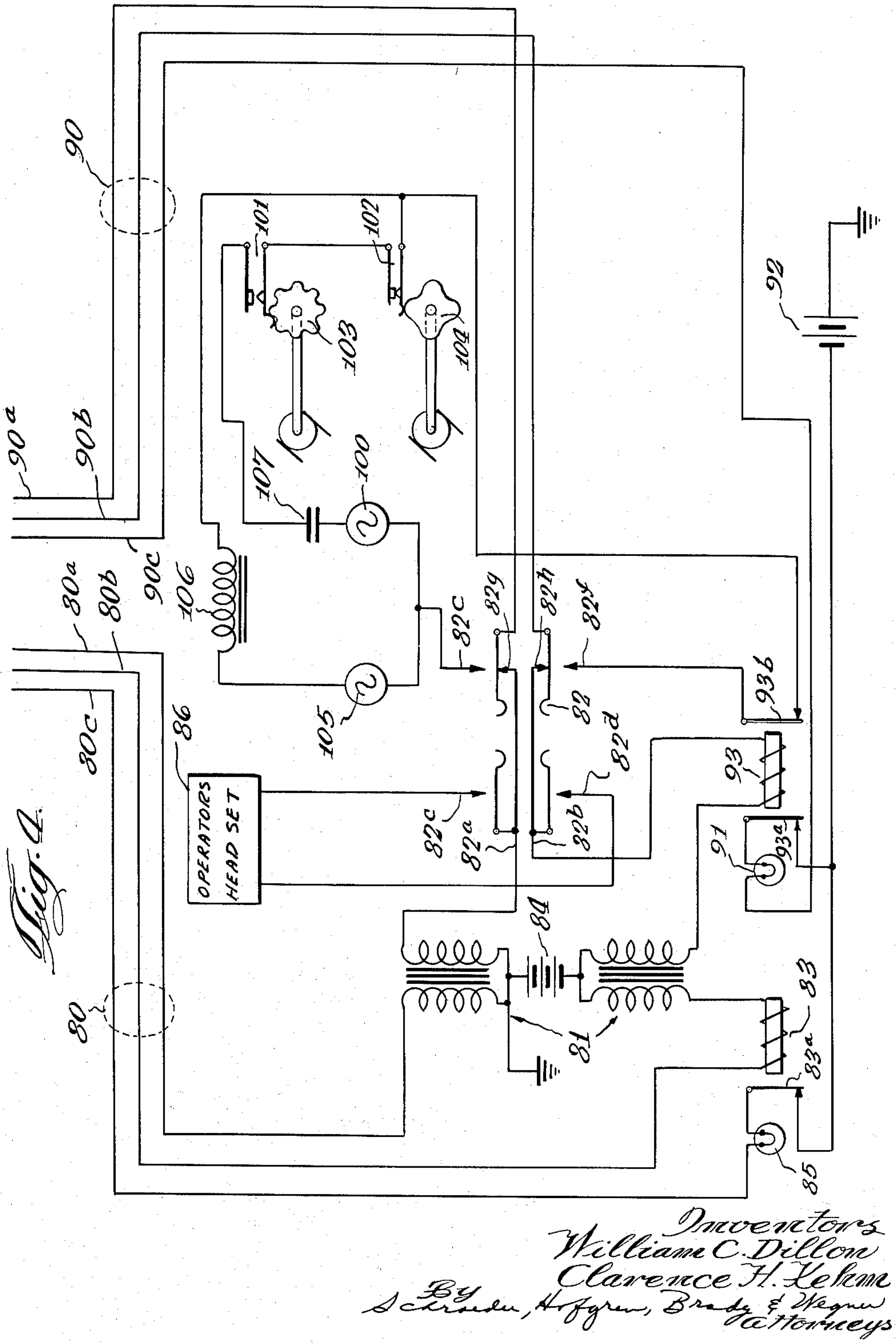
FIGURE 4 is a schematic diagram of a central station office connector unit illustrating the circuit used for pulsed ringing.

Reference will now be made to FIGURE 4 of the drawings which shows the operator's connector unit at the switchboard at the central station. With the exception of the ringing circuit, this connector unit is identical with that disclosed in our aforementioned patents and will be described only briefly herein.

Cable 80 is the operator's connector cord for plugging in the calling party and comprises conductors 80*a*, 80*b* and 80*c* connected to the tip 51*a*, ring 51*b* and shell 51*c* respectively of plug 51, FIGURE 2. Similarly, cable 90 is the operator's connector cord for plugging in the called party and comprises conductors 90*a*, 90*b* and 90*c* connected to the tip, ring and shell respectively of a similar plug. It is believed that the purpose and operation of the rest of the elements of this circuit will be readily apparent from the description of the actions which take place in completing a call.

As previously discussed, when a subscriber desires to initiate a call, his action in picking up the handset of his telephone results in the closing of contacts 39*a* and 39*b* associated with central office relay 39 which energizes lamp 44 physically associated with jack 46 on the switchboard and completes the connection of leaf member 46*b* to audio transformer 33. The operator will then insert plug 51 in jack 46, opening switch 52 and deenergizing lamp 44 on the switchboard. At the same time, this results in the connection of the audio circuit to conductors 80*a* and 80*b* of cable 80.

The audio signal from the subscriber will be separated from the carrier wave by demodulator 32 and coupled through transformer 33, cable 80 and repeater coil 81 to cam switch 82, the signal appearing at terminals 82*a* and 82*b* thereof. At the same time, relay 83 is energized by battery 84, a continuous circuit being formed by conductor 80*b* through ring 51*b* of the plug, leaf 46*b* of the jack, contact 39*b* of relay 39, the secondary of transformer 33, leaf 46*a* of the jack, tip 51*a* of the plug and conductor 80*a* of the operator's connector. Energization of this relay opens contact 83*a* associated therewith preventing energization of lamp 85. The operator at the same time operates cam switch 82 in a first direction, causing contacts 82*c* and 82*d* associated therewith to close, connecting the operator's headset 86 into the audio circuit.

After the operator has determined from the calling subscriber the party to be called, the necessary connection may be made using connector 90, which is provided with a plug of the same type as that used on connector 80. With the connector 90 plugged into the central station unit of the party to be called, indicator light 91, associated with the called party connector cable, will be energized by battery 92. This circuit is completed through contact 93*a* of relay 93, conductor 90*c*, the shell of the plug associated with the called party connector and the grounded ring portion of the switchboard jack of the called party. Relay 93 is not energized at this time as the contacts associated with the central station relay of the called party are open and the D.C. circuit in the secondary of the called party audio transformer is broken (this circuit being the same as that shown in FIGURE 2).

Ringing may be effected by the operator by operating the cam switch in a direction opposite to that formerly described, connecting contacts 82*e* and 82*f* to the audio circuit of the called party through conductors 90*a* and 90*b* of connector 90. Such operation of the switch breaks contacts 82*g* and 82*h*, preventing the ringing signal from affecting the line of the calling party.

The operator will normally leave cam switch 82 in the last described position, with contacts 82*e* and 82*f* closed until the called party answers the phone; this action deenergizing the called party's central station relay as previously described and allowing the switch contacts associated therewith to close. This action in turn completes the secondary circuit of the called party's audio transformer circuit, energizing relay 93 and opening contacts 93*a* and 93*b* associated therewith. The opening of contact 93*a* deenergizes indicator lamp 91 while the opening of contact 93*b* removes the ringing generators from the circuit. The switchboard indicator lamp associated with the called party's jack is not lit at this time by virtue of the fact that the plug of the called party connector 90 is in place in the jack, as explained in connection with FIGURE 2. The operator, noting that indicator lamp 91 is out will then return cam switch 82 to its central position, completing the circuit as shown in FIGURE 4, permitting the parties to hold their conversation.

Basically, the ringing means utilized in this system comprises an audio oscillator 100, the output of which is coupled through cam switch 82 to conductors 90*a* and 90*b* of the switchboard connector for the called party. This audio signal then modulates the carrier wave of the called party and provides an indication at the called party's substation as will be described later. It has been pointed out that in order to disconnect his line from the ringing circuit, the called party must lift his handset from the cradle effecting deenergization of the associated central office relay as described in connection with FIGURE 2. In order to operate satisfactorily however, the amplitude of the ringing signal must be such that it modulates the carrier wave at a rather high percentage as of the order of 80% or 90%. It has been found that with this high percentage of modulation, the change, here a drop, occurring in the voltage on the transmission line when the called party lifts his receiver, is often insufficient to cause the desired operation of the central office relay.

In order to obviate this difficulty we have devised the new ringing system shown in FIGURE 4 which provides for pulsed modulation of the carrier wave by the ringing signal. The desired pulsed operation is obtained by incorporating in the circuit of the ringing signal generator 100 switch means operated by a motor-driven cam arrangement. In this instance, a pair of switches 101 and 102 operated by motor-driven cams 103 and 104 respectively, are shown. Switch 102 and its associated cam 104 operate to open and close the ringing circuit periodically, as for example at half second intervals. Switch 101 and cam 103 may interrupt the circuit to pulse the ringing signal at a rate of about four times per second.

This ringing system serves a dual function. Primarily, it is designed to provide intervals during ringing in which only the carrier is present on the transmission line, permitting the central station relay of the called party to operate if such party has answered the phone; this is done by switch 102 and cam 104. Further, the pulsed ringing signal, particularly the combination of both long and short pulse intervals provides a ringing signal which is particularly attention getting.

Signal generator 105 shown in the drawings may be a conventional subaudio frequency generator commonly used in telephone exchanges for ringing on conventional circuits. Choke 106 prevents generator 105 from shorting generator 100 while capacitor 107 prevents generator 100 from shorting generator 105.

Figure 5:
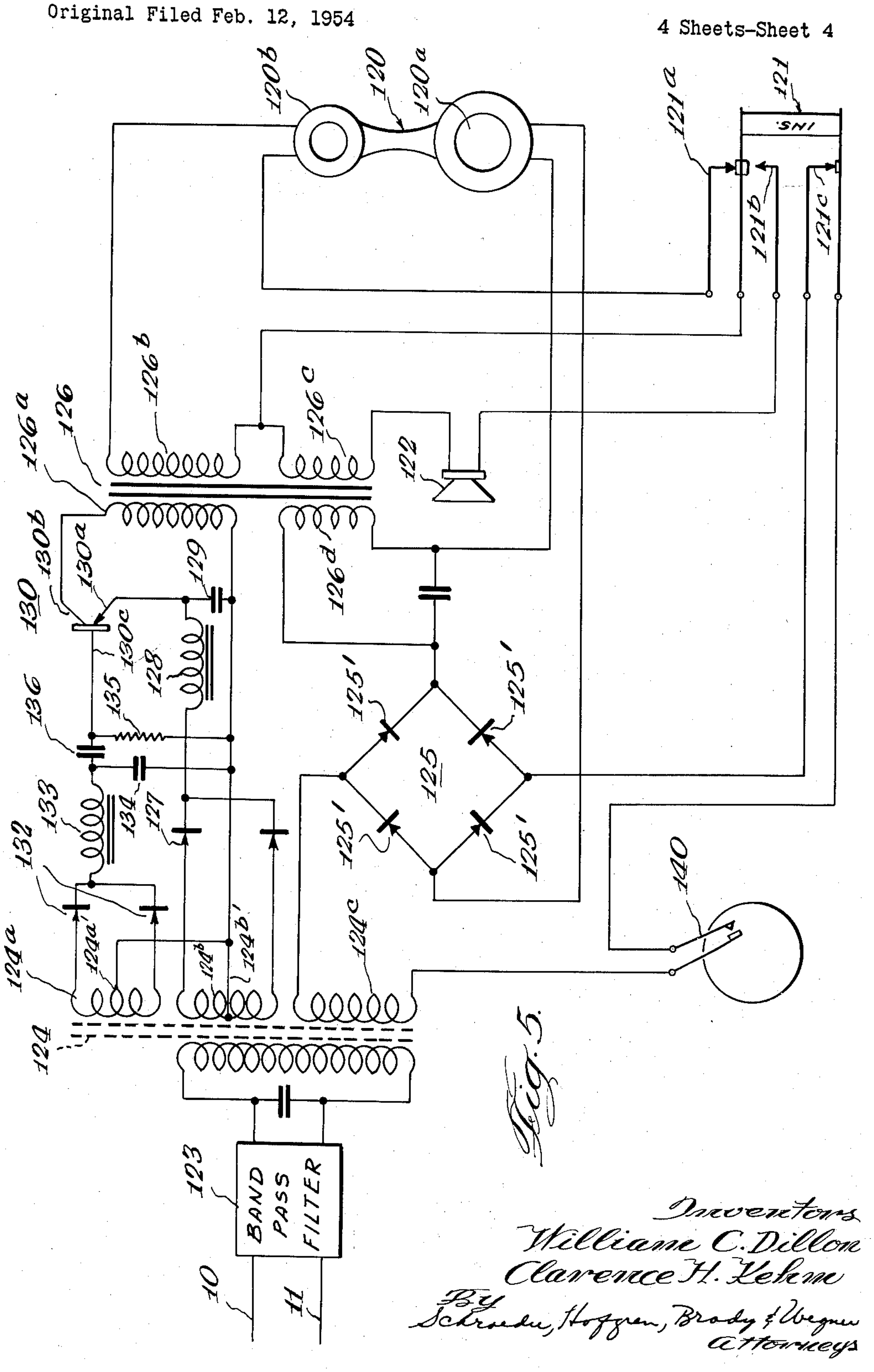
FIGURE 5 is a schematic diagram of a subscriber's unit showing an embodiment of the transistor amplifier circuit which may be used therewith.

Referring now to FIGURE 5, certain improvements in the subscriber's local substation will be discussed.

The subscriber's substation unit preferably includes a handset 120 including a transmitter 120*a* and receiver 120*b*. A hook switch 121 for controlling various circuits in the substation is incorporated in a standard telephone cradle, while the rest of the elements of the circuit are preferably mounted within the base of the cradle. A loud speaker 122 is provided for signalling to the party by means of the ringing system previously described.

The transmission line, 10 and 11, is coupled to the substation through a band pass filter 123 tuned to the carrier frequency of the particular substation and terminated by transformer 124 which has three secondary windings 124*a*, 124*b* and 124*c*.

When the handset 120 rests in the cradle, the contacts associated with hook switch 121 are in the opposite condition to that shown in the drawings, contacts 121*a* and 121*c* being open while contact 121*b* is closed. This accomplishes a number of things. Full wave bridge rectifier 125, which comprises four cold rectifier units 125′, is not connected across secondary 124*c* of transformer 124 as contact 121*c* associated with hook switch 121 is open. Thus there is a relatively small load on the line and the carrier voltage thereon is relatively high as earlier discussed. Loud speaker 122 is operatively connected to secondary winding 126*c* of transformer 126 through contact 121*b* of hook switch 121.

Winding 124*b* of the input transformer is provided with a center tap 124*b′* and is connected to a pair of cold emission rectifiers 127 forming a full wave rectifier circuit. The output of the rectifier is filtered by a choke 128 and capacitor 129 and provides a D.C. bias for transistor amplifier 130.

Secondary 124*a* is also center tapped at 124*a′*, this center tap being connected to the center tap of winding 124*b*. A full wave detector circuit including a pair of cold rectifiers 132 is connected to secondary winding 124*a* and the carrier frequency is filtered from the output of the detector circuit by inductor 133 and capacitor 134, the audio intelligence carried by the signal appears across capacitor 134.

Transistor amplifier 130 is preferably of the junction type and is provided with an emitter electrode 130*a*, collector electrode 130*b* and base electrode 130*c*. The transistor 130 is connected for grounded emitter operation, with the emitter being connected to the bias rectifiers 127 through choke 128. A resistor 135 forming part of the bias network is connected between the base 130*c* and the bias reference, center tap 124*b′*. The output of detector rectifiers 132 is coupled through a D.C. blocking capacitor 136 to the base electrode 130*c* of the transistor. The amplifier output appears in the circuit of collector 130*b* and is developed in winding 126*a* of transformer 126.

The loud speaker 122 is preferably designed to resonate mechanically at the frequency of ringing generator 100. If the substation in question is called, the ringing signal modulates the carrier frequency associated therewith and is coupled through transformer 124, transistor amplifier 130 and transformer 126, causing an audio indication in loud speaker 122 indicating to the subscriber that he should answer the phone.

When the subscriber lifts the handset 120, hook switch 121 moves to the position shown in the drawing and loud speaker 122 is disconnected from the circuit by virtue of the opening of contact 121*b*. In addition, contact 121*c* closes connecting rectifier 125 across secondary 124*c* of transformer 124.

Rectifier 125 and transmitter 120*a* of the handset, which is connected to the output of the rectifier, provide a substantial load on the transmission line causing the voltage level of the carrier signal thereon to drop substantially. This in turn causes the deenergization of the central station relay associated with central station unit corresponding to the particular subscriber's substation, disconnecting the ringing circuit from the line and completing the audio circuit as previously discussed.

At the same time, receiver 120*b* of handset 120 is connected to secondary 126*b* of transformer 126 through contact 121*a* of hook switch 121. A conversation may now be carried on in the normal manner.

Full wave rectifier 125 serves the dual function of providing a D.C. energizing current for transmitter 120*a* and of effecting modulation of the carrier signal by the audio information from the transmitter. The incoming signals are amplified by transistor amplifier 130 and coupled through transformer 126 to receiver 120*b*.

The output of rectifier 125, in addition to providing a D.C. energizing current for transmitter 120*a*, includes a component of the audio information carried by the incoming carrier wave. This audio signal is coupled through winding 126*d* of audio transformer 126 in such a manner that it is in phase with the output signal of transistor amplifier 130, developed in winding 126*a*. The audio signal from rectifier 125 thus adds to the signal appearing in secondary 126*b*, providing an appreciable increase in volume at receiver 120*b*.

The added amplification provided at the subscriber's substation by the transistor amplifier permits the use of the carrier wave system over substantially greater distances than has heretofore been possible. Furthermore, the use of a transistor amplifier together with cold emission rectifying means provides this amplification without the necessity for incorporating a power supply unit at the substation. All the power which is necessary to operate the transistor may be readily obtained by rectifying a portion of the carrier signal. The use of a portion of the carrier signal for D.C. power for the transistor does not adversely affect the signal inasmuch as signal modulation normally is of the order of 10%–20%.

It may be desirable in some cases to incorporate a provision for dialing with a carrier wave system. This has been accomplished by the inclusion of dial switch 140 in the circuit of secondary 124*c* of transformer 124. When a subscriber desires to initiate a call, removal of the handset 120 from hook switch 121 completes the connection of secondary 124*c* and loads the line providing an indication at the central station as previously discussed. Operation of the dial in normal manner effects alternate opening and closing of dial switch 140 in accordance with the digits of the number being called causing a corresponding variation in the carrier voltage level on the transmission line. This information may be utilized at the central station by means of suitable relays and step switches as is well known in the art.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. A bi-directional telephone voice signal system of the carrier wave type comprising:

(*a*) a transmission line, (*b*) a central station including transmitting and receiving means operable at a discrete frequency connected to the transmission line, (*c*) a subscriber station including transmitting and receiving means operable at the same discrete frequency as the central station transmitting and receiving means connected to the transmission line at a point spaced from the central station, (*d*) an adjustable phase shifting network connected in the transmission line at the central station to compensate for the inherent phase shift in the transmission line and the subscriber station, (*e*) a preadjusted phase shifting network connected in the transmission line at the central station to compensate for the inherent phase shift in the central station, the preadjusted phase shifting network being spaced from the adjustable phase shifting network;

(*f*) a carrier wave generator connected to the transmission line between the adjustable phase shifting network and the preadjusted phase shifting network, and (*g*) a band pass filter tuned to the frequency of the carrier wave generator connected in the transmission line between the preadjusted phase shifting network and the connection to the carrier wave generator.

2. A bi-directional telephone voice signal system of the carrier wave type as defined in claim 1 wherein the adjustable phase shifting network comprises a lattice network of series connected inductors and parallel connected capacitors ganged together for simultaneous adjustment to provide a variable phase shifting arrangement.

References Cited in the file of this patent

UNITED STATES PATENTS

| | | |
|---|---|---|
| 2,102,138 | Strieby | Dec. 14, 1937 |
| 2,214,130 | Green et al. | Sept. 10, 1940 |
| 2,273,719 | Morrison | Feb. 17, 1942 |
| 2,379,744 | Pfleger | July 3, 1945 |
| 2,490,833 | Ransom | Dec. 13, 1949 |
| 2,530,824 | King | Nov. 21, 1950 |
| 2,604,544 | Dillon et al. | July 22, 1952 |